(12) United States Patent
Fosler

(10) Patent No.: US 10,353,517 B2
(45) Date of Patent: Jul. 16, 2019

(54) DIFFERENTIAL IIR BASELINE ALGORITHM FOR CAPACITIVE TOUCH SENSING

(71) Applicant: Parade Technologies Ltd., Santa Clara, CA (US)

(72) Inventor: Ross Martin Fosler, Snohomish, WA (US)

(73) Assignee: PARADE TECHNOLOGIES LTD., Santa Clara, CA (US)

( * ) Notice: Subject to any disclaimer, the term of this patent is extended or adjusted under 35 U.S.C. 154(b) by 592 days.

(21) Appl. No.: 15/071,084

(22) Filed: Mar. 15, 2016

(65) Prior Publication Data

US 2016/0274730 A1 Sep. 22, 2016

Related U.S. Application Data

(60) Provisional application No. 62/133,797, filed on Mar. 16, 2015.

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01)

(58) Field of Classification Search
CPC .............................. G06F 3/0418; G06F 3/044
USPC ........................................................ 345/174
See application file for complete search history.

(56) References Cited

U.S. PATENT DOCUMENTS

| | | |
|---|---|---|
| 2007/0074913 A1 | 4/2007 | Geaghan et al. |
| 2007/0229468 A1 | 10/2007 | Peng et al. |
| 2011/0069794 A1* | 3/2011 | Tavassoli Kilani .......... H04L 25/0274 375/346 |
| 2012/0050216 A1* | 3/2012 | Kremin ................. G06F 3/0416 345/174 |
| 2012/0268415 A1 | 10/2012 | Konovalov et al. |
| 2013/0080109 A1 | 3/2013 | Peng et al. |

OTHER PUBLICATIONS

Parade, International Search Report and Written Opinion, PCT/US2016/022696, dated Jun. 16, 2016, 10 pgs.
Parade, International Preliminary Report on Patentability, PCT/US2016/022696, dated Sep. 19, 2017, 8 pgs.

* cited by examiner

*Primary Examiner* — Mark Edwards
(74) *Attorney, Agent, or Firm* — Morgan, Lewis & Bockius LLP

(57) ABSTRACT

A method of processing raw response signals for capacitive sense arrays is performed at an electronic device having one or more processors and a capacitive sense array. The process receives a raw response signal from the capacitive sense array. The process computes an offset signal that represents an average baseline value of the raw response signal over a period of time and filters the raw response signal to a limited frequency band, thereby forming a bandwidth limited signal. The process also computes a differential signal as the difference between the offset signal and the bandwidth limited signal and uses the differential signal to detect an object proximate to the capacitive sense array.

20 Claims, 15 Drawing Sheets

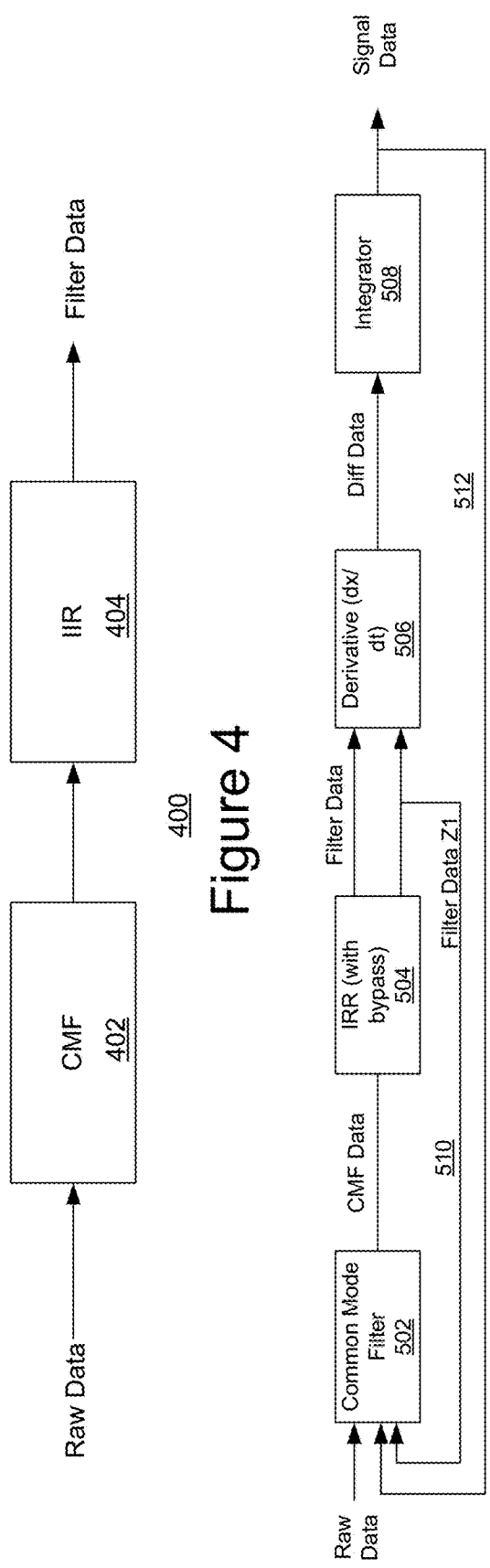
Figure 4
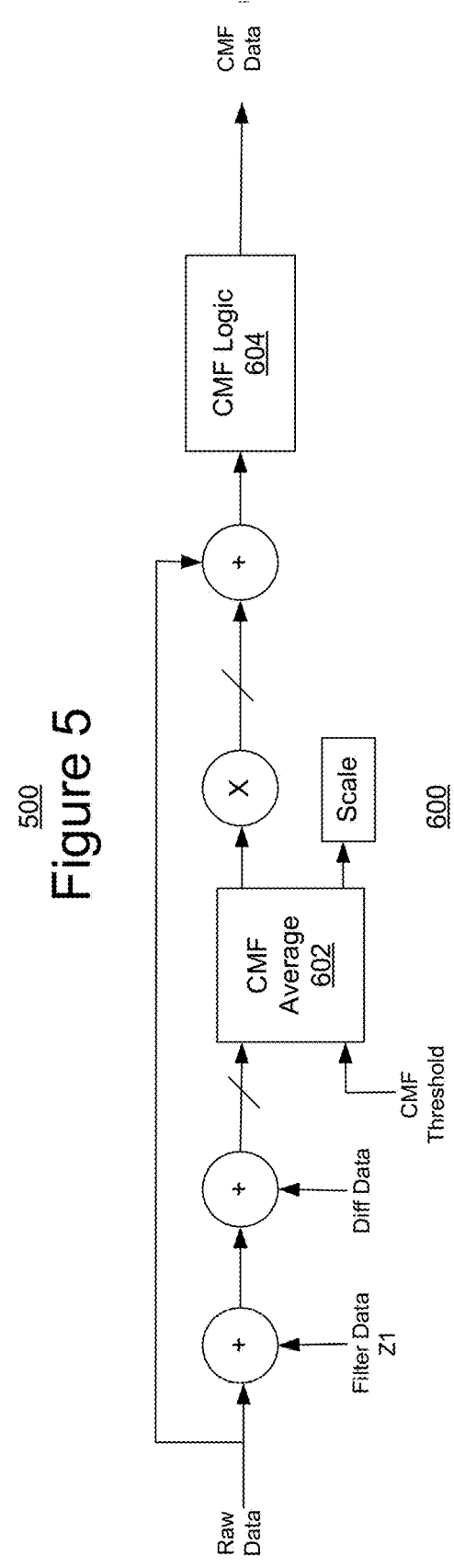
Figure 5
Figure 6

700

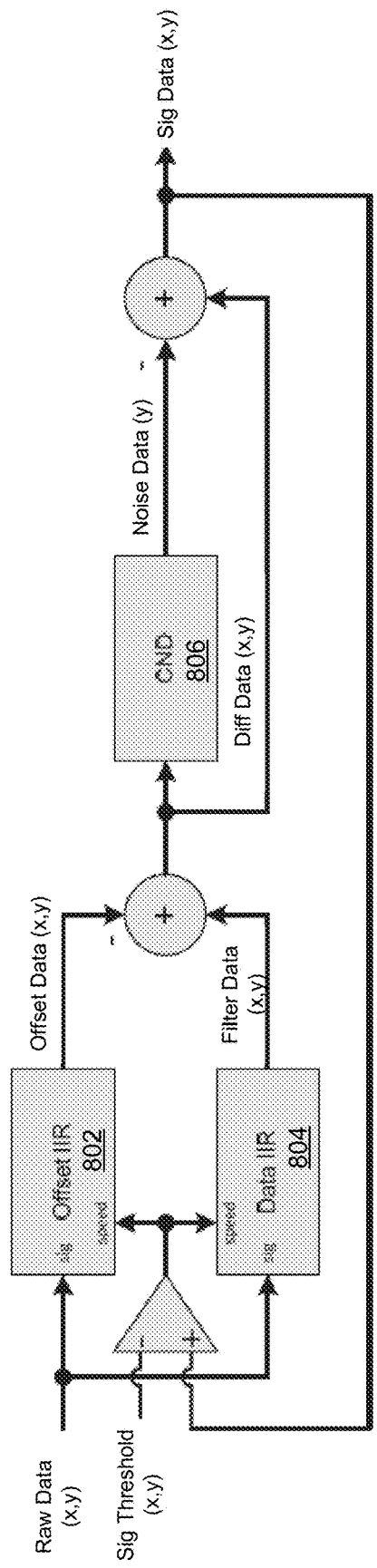
Figure 8.1

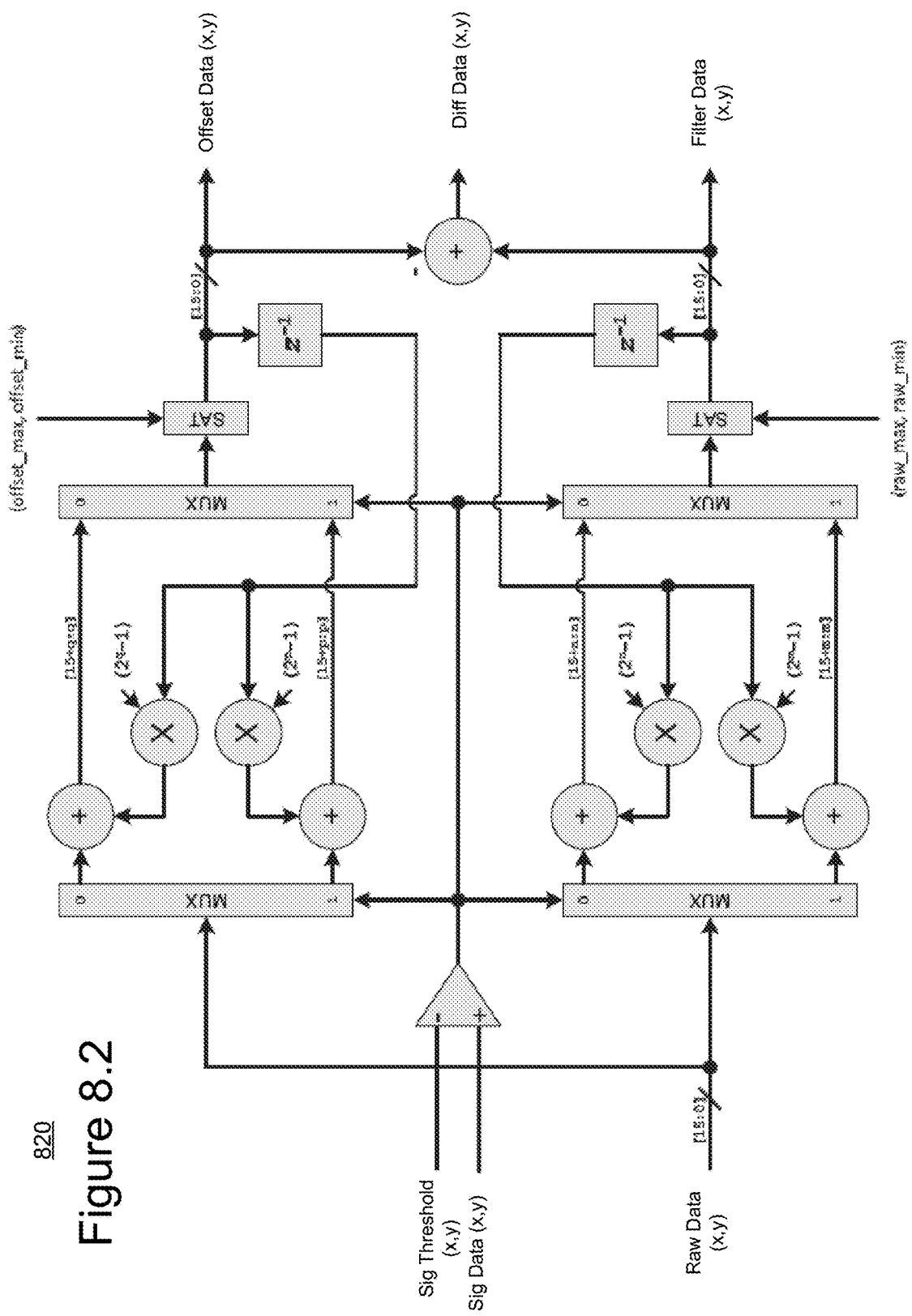
Figure 8.2

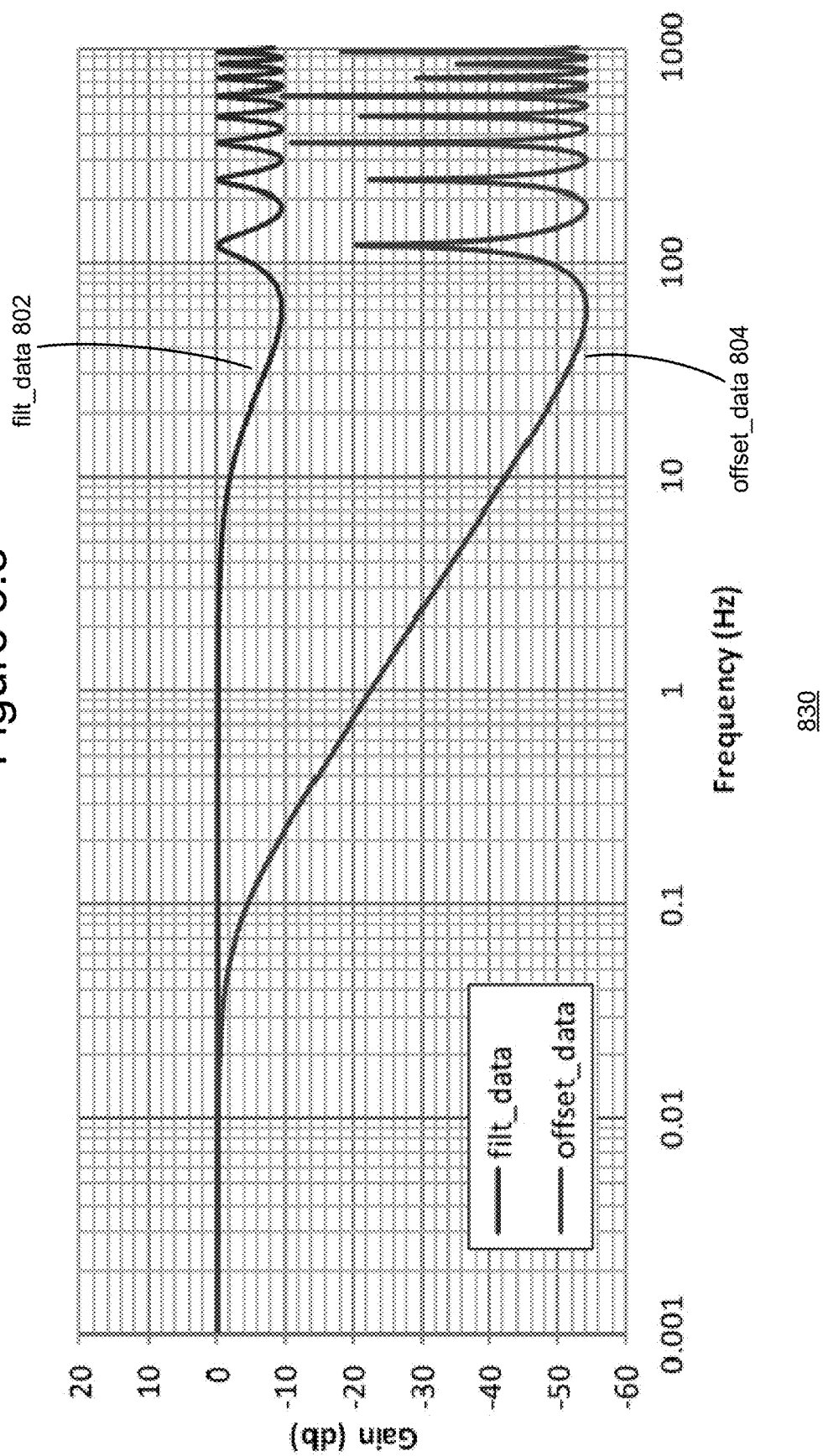
Figure 8.3

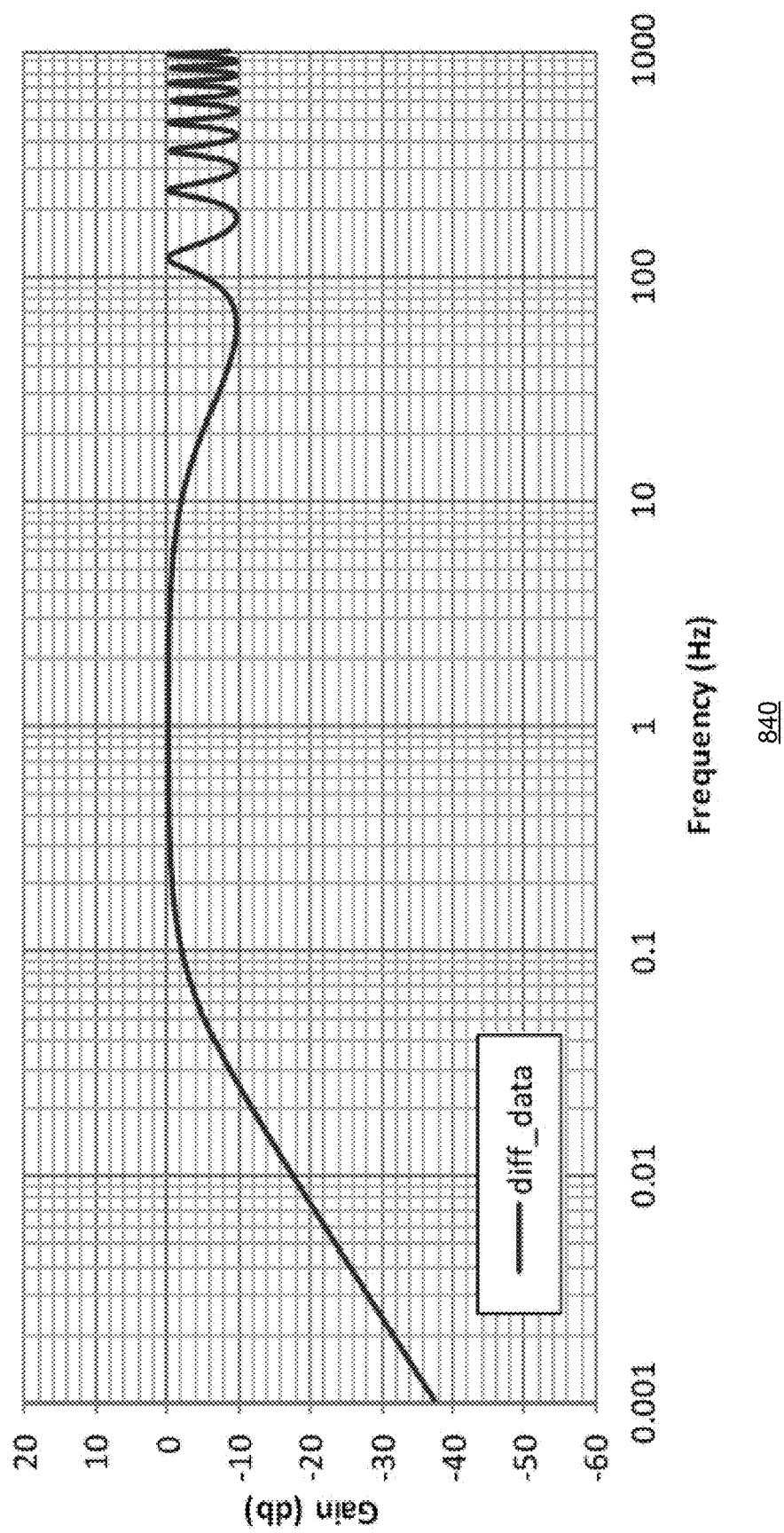
Figure 8.4

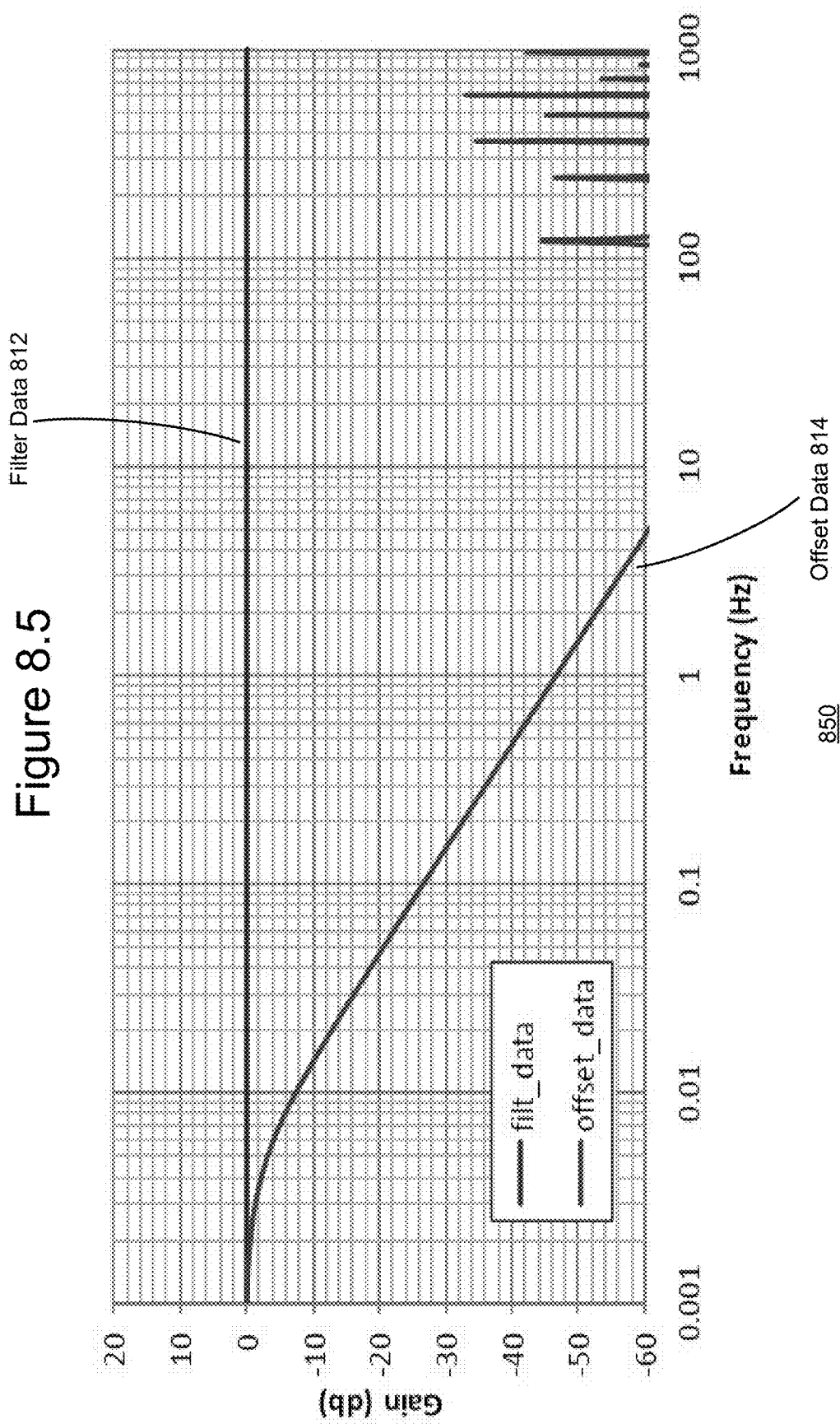
Figure 8.5

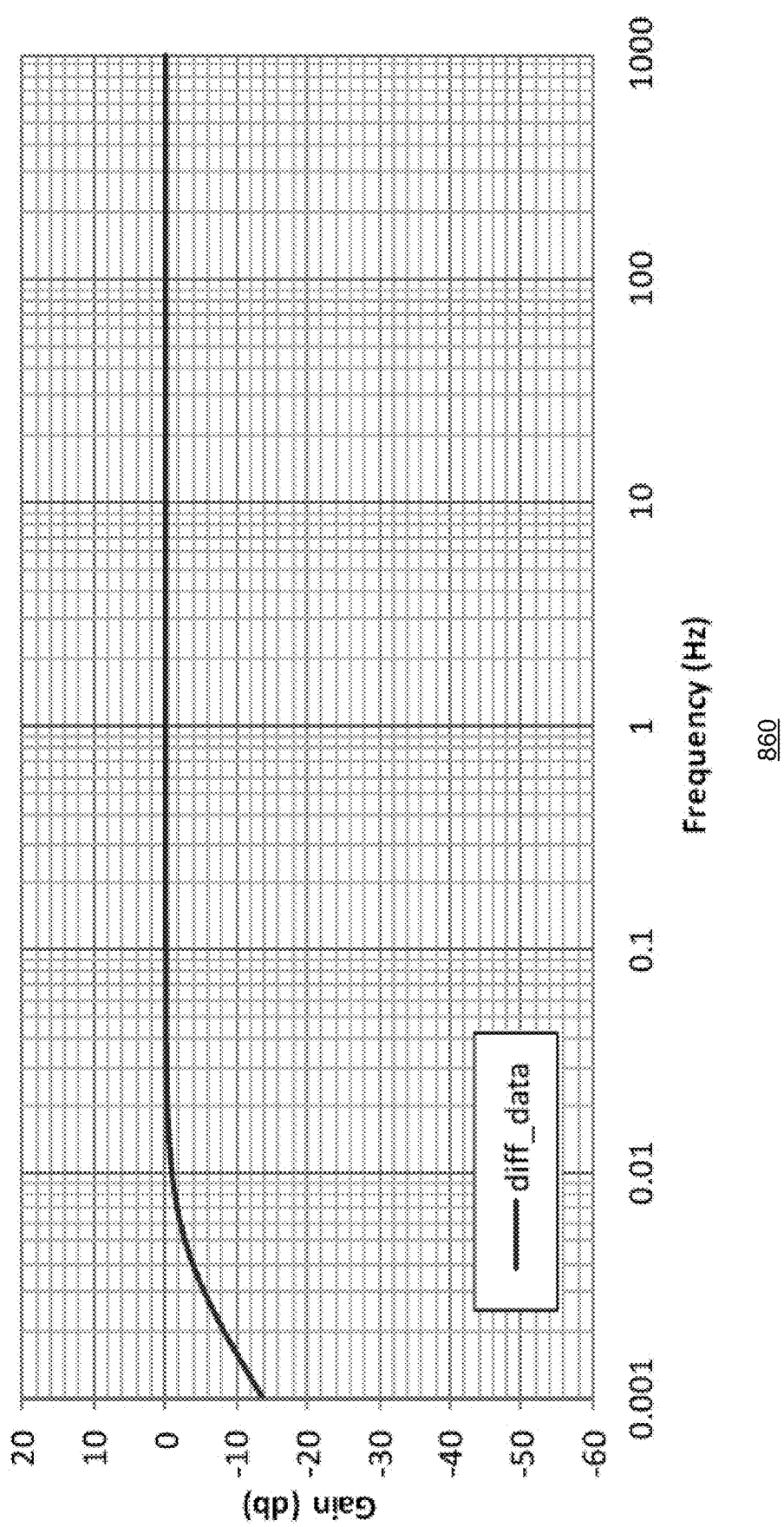
Figure 8.6

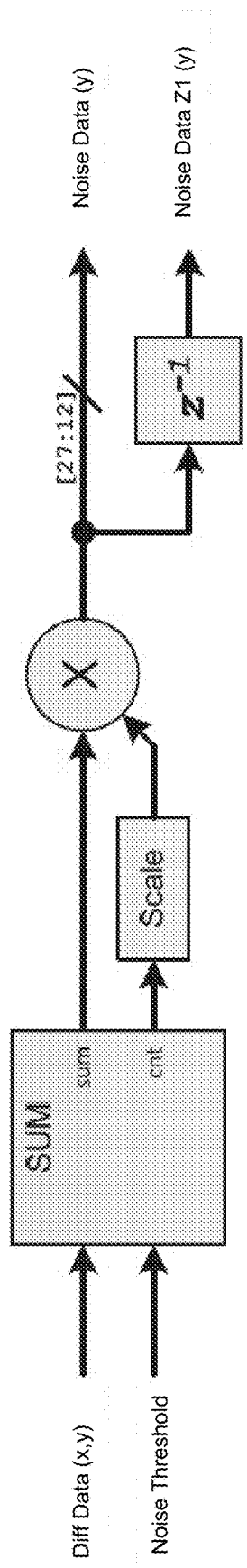
Figure 8.7
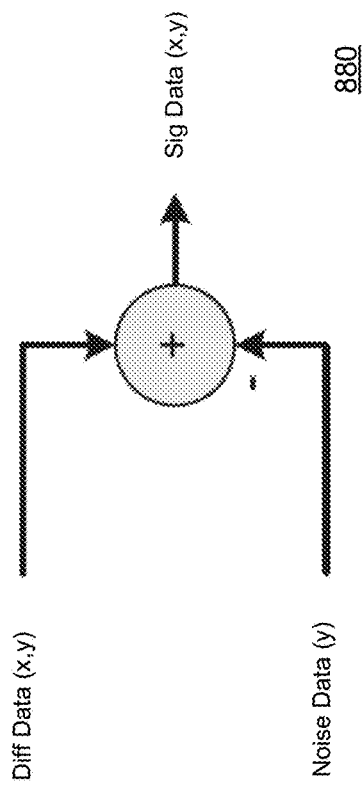
Figure 8.8

Figure 8.9
890

Row Noise Data 896

Mutual Capacitance Offset Data
894

Mutual Capacitance Filter Data
892

```
{
    uint32      column;
    int32       ac_sig;
    int32       diff;
    int32       sum;
    unit32      sum_count;

* Local init */
    Sum = 0;
    Sum_count = 0;

/* Process an entire row of data through the filters and the CMF integrator */
    For (column = FILT_COLUMN_SIZE-1; column--;)
    {
        /* Get the last known AC signal and diff. */
        diff = (int32)(filt_filt_dat a[column]- filt_offset_data[column]);
        ac_sig = diff - FILT_NOISE_DATA_PTR[filt_row];

/* Process the filters. */
        If ((ac_sig > -FILT_IIR_ACCEL_THRESHOLD) && (ac_sig < FILT_IIR_ACCEL_THRESHOLD))
        {
            /* Speed up the baseline while slowing down the data filtering. */
            filt_offset_data[column] = ((filt_offset_data[column] *
                        (unit32)((1 << FILT_IIR_OFFSET_COEFF_FAST) -1)+
                        FILT_SAMPLE_DATA_PTR[column]) >> FILT_IIR_OFFSET_COEFF_FAST);
            filt_filt_data[column] = ((filt_filt_data[column] *
                        (unit32)((1 << FILT_IIR_FILT_COEFF_SLOW) -1)+
                        FILT_SAMPLE_DATA_PTR[column]) >> FILT_IIR_FILT_COEFF_SLOW);
        }
        else
        {
            /* Slow down the baseline while speeding up the data filtering. */
            filt_offset_data[column] = ((filt_offset_data[column] *
                        (unit32)((1 << FILT_IIR_OFFSET_COEFF_SLOW) -1)+
                        FILT_SAMPLE_DATA_PTR[column]) >> FILT_IIR_OFFSET_COEFF_SLOW);
            filt_filt_data[column] = ((filt_filt_data[column] *
                        (unit32)((1 << FILT_IIR_FILT_COEFF_FAST) -1)+
                        FILT_SAMPLE_DATA_ PTR[column]) >> FILT_IIR_FILT_COEFF_FAST);
        }

/* Proces the sum of the differences for the CMF */
        if ((diff > -FILT_NOISE_DATA_PTR[filt_row] = (sum * filt_avg_coef[sum_count]) >> 12;
        {
            sum += diff;
            sum_count++;
        }
    }

/* Compute an approximate average noise */
    FILT_NOISE_DATA_PTR[filt_row] = (sum * filt_avg_coef[sum_count]) >> 12;

DIFFERENTIAL IIR BASELINE ALGORITHM FOR CAPACITIVE TOUCH SENSING

RELATED APPLICATIONS

This application claims priority to U.S. Provisional Application Ser. No. 62/133,797, filed Mar. 16, 2015, entitled "Differential IIR Baseline Algorithm for Capacitive Touch Sensing," which is incorporated by reference herein in its entirety.

TECHNICAL FIELD

The disclosed implementations relate generally to touch-sensitive displays, and in particular, to computing baselines that are used in proximity sensing on a touch-sensitive display.

BACKGROUND

Computing devices, such as notebook computers, personal digital assistants, mobile communication devices, portable entertainment devices (e.g., handheld video game devices, multimedia players) may include user interface devices that facilitate interaction between a user and the computing device.

One type of user interface device that has become more common operates by way of capacitance sensing. A capacitance sensing system may include a touch screen, touch-sensor pad, a touch-sensor slider, or touch-sensor buttons, and may include an array of one or more capacitive sensor elements (also referred to as sensor electrodes). Capacitive sensing typically involves measuring, through sensor signals (e.g., increases or decreases in electrode responses), a change in capacitance associated with the capacitive sensor elements to determine a presence of a conductive object (e.g., a user's finger or a stylus) relative to the capacitive sensor elements.

Changes in capacitance are measured across arrays of sensors when they are used for sensing and processing capacitive touch applications. Because the "changes" are measured, changing information (AC or delta information) is desired in order to detect variation in capacitance, while constant information (DC or signal offset) is not desired. The DC component is rejected. The term "baseline" refers to the offset, or base capacitance that is already present on a sensor. The challenge is how to detect what the baseline is for one or more sensors and efficiently remove the baseline from the received signal while conditioning the remaining signal for further processing (e.g., determining if an object is in a specific location on a capacitive sensor array). Current methods to address this issue are both complex and inefficient, and not always effective.

SUMMARY

Disclosed implementations of systems, methods, and devices address the problems associated with processing response signals generated by capacitive sense arrays.

In some implementations, a method of processing raw response signals for capacitive sense arrays is performed at an electronic device having one or more processors and a capacitive sense array. The method receives a raw response signal from the capacitive sense array. The method computes an offset signal that represents an average baseline value of the raw response signal over a period of time and filters the raw response signal to a limited frequency band, thereby forming a bandwidth limited signal. The method computes a differential signal as the difference between the offset signal and the bandwidth limited signal and uses the differential signal to detect an object proximate to the capacitive sense array.

In some implementations, the method applies a common noise detector to the differential signal to identify a noise signal. In some implementations, the method subtracts the noise signal from the differential signal to form an output signal.

In some implementations, the method adjusts a speed of the offset signal computation and a speed of the response signal filtering when the raw response signal crosses a threshold value at a first time. In some implementations, adjusting a speed of the offset signal computation and a speed of the response signal filtering includes increasing the speed of the offset signal computation and decreasing the speed of the response signal filtering. In some implementations, the method decreases the speed of the offset signal computation and increases the speed of the response signal filtering at a second time subsequent to the first time.

In some implementations, a system includes a capacitive sense array and one or more processing devices coupled to the capacitive sense array. The processing devices are configured to perform any of the method described herein.

In some implementations, a non-transitory computer-readable storage medium stores one or more programs configured for execution by one or more processors of a sensing system. The one or more programs include instructions for performing any of the methods described herein.

BRIEF DESCRIPTION OF THE DRAWINGS

For a better understanding of the aforementioned implementations of the invention as well as additional implementations thereof, reference should be made to the Detailed Description below, in conjunction with the following drawings in which like reference numerals refer to corresponding parts throughout the figures.

FIG. 4 is a block diagram of basic raw filtering in accordance with some implementations.

FIG. 5 is a block diagram of actual raw filtering in accordance with some implementations.

FIG. 6 is a block diagram of common mode filtering in accordance with some implementations.

FIG. 8.1 is a block diagram of a raw data filtering/processing algorithm according to some implementations.

FIG. 8.2 is a block diagram of IIR filter stages according to some implementations.

FIG. 8.3 provides an example filter response when there is a small signal change in accordance with some implementations.

FIG. 8.4 provides an example raw input to differential output response when there is a small signal change, in accordance with some implementations.

FIG. 8.5 provides an example filter response when there is a large signal change in accordance with some implementations.

FIG. 8.6 provides an example raw input to differential output response when there is a large signal change, in accordance with some implementations.

FIGS. 8.7 and 8.8 provide block diagrams of a common noise detection and common noise filtering according to some implementations.

FIG. 8.9 illustrates memory usage by some implementations.

FIG. 8.10 provides pseudo code to implement a differential IIR baseline algorithm according to some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DETAILED DESCRIPTION

Figure 1:
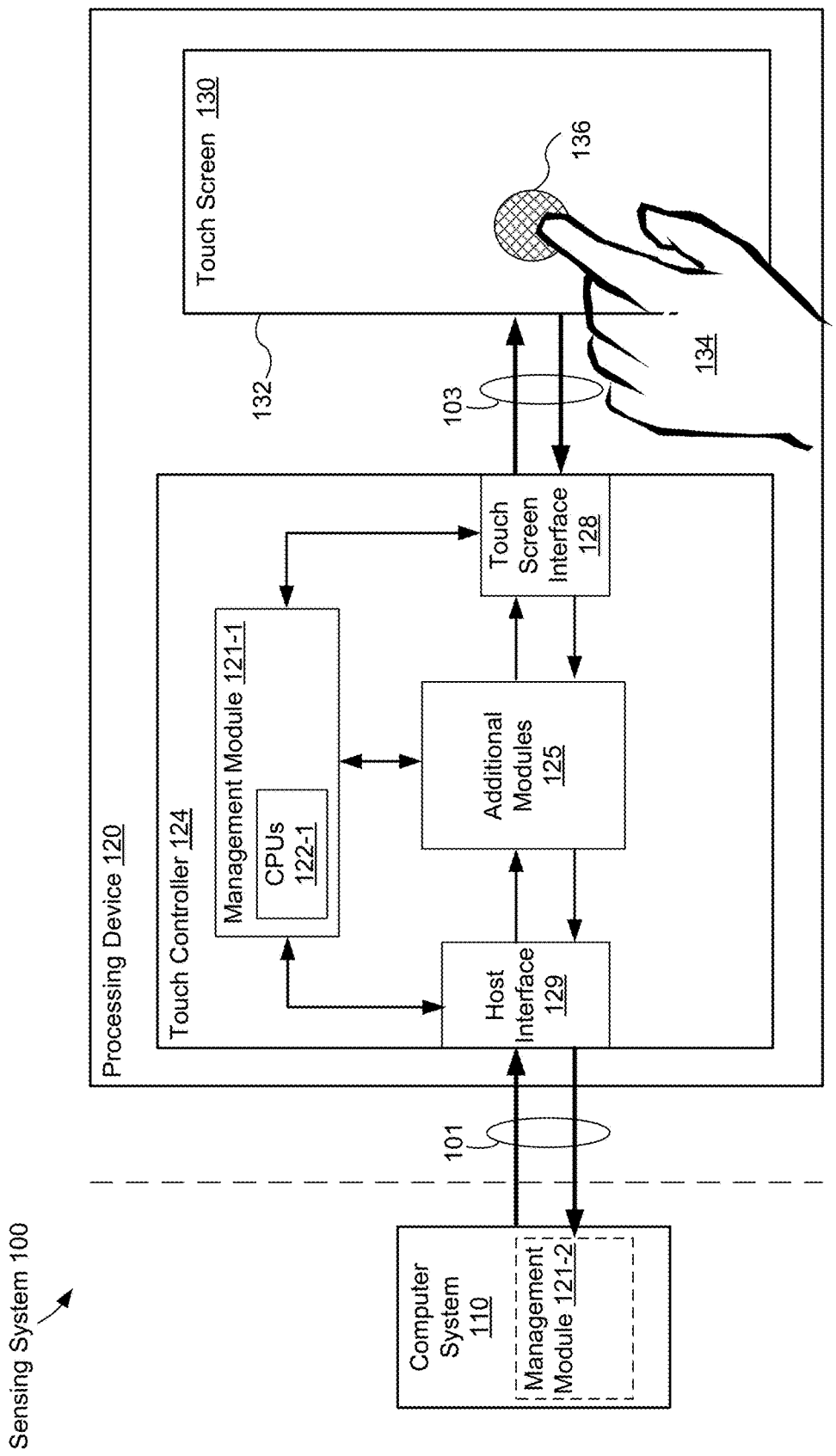
FIG. 1 is a block diagram illustrating a sensing system, in accordance with various implementations.

The various implementations described herein include systems, methods and/or devices used to process raw sense signals for touchscreen proximity sensing. Numerous details are described herein in order to provide a thorough understanding of the example implementations illustrated in the accompanying drawings. However, some implementations may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein FIG. 1 is a block diagram illustrating a sensing system 100, in accordance with various implementations. While some example features are illustrated, various other features have not been illustrated for the sake of brevity and so as not to obscure pertinent aspects of the example implementations disclosed herein. To that end, as a non-limiting example, sensing system 100 includes a processing device 120 (also sometimes called a touch sensitive device), which includes a touch controller 124 and a touch screen 130 (also sometimes called a touch sensitive display), and is used in conjunction with or includes a computer system 110 (e.g., a host system or a host computer). In some implementations, the sensing system 100 provides the functionality of a touch screen, a touchpad, a slider, a button, a switch, a level sensor, a proximity sensor, a displacement sensor, a combination thereof, or provides some other functionality based on a detection of a user input. In some implementations, the touch screen provides the functionality of a proximity sensor.

The computer system 110 is coupled to the touch controller 124 through data connections 101. However, in some implementations the computer system 110 includes the touch controller 124, or a portion of the touch controller 124, as a component and/or as a subsystem. For example, in some implementations, some or all of the functionality of the touch controller 124 is implemented by software executed on the computer system 110. The computer system 110 may be any suitable computer device, such as a laptop computer, a tablet device, a netbook, a personal digital assistant, a mobile phone, a smart phone, a gaming device, a computer server, or any other computing device. The computer system 110 is sometimes called a host or a host system. In some implementations, the computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110.

The touch screen 130 is coupled to the touch controller 124 through the connections 103. In some implementations, however, the touch controller 124 and the touch screen 130 are included in the same device (i.e., an integrated electronic device) as components thereof. Furthermore, in some implementations, the touch controller 124 and the touch screen 130 are embedded in a host device (e.g., computer system 110), such as a mobile device, tablet, other computer or computer controlled device, and the methods described herein are performed, at least in part, by the embedded the touch controller. The touch screen 130 includes a sensing array 132 (e.g., a capacitive sense array) that forms a touch sensitive display. In some implementations, the sensing array 132 includes one or more of light-sensitive elements, light emitting elements, photosensitive elements, pressure sensitive elements, and/or capacitive sensor elements (also referred to as sensor electrodes). The capacitive sensor elements are electrodes of conductive material, such as copper. The sensing array 132 is sensitive to an input object 134 at a location 136 (e.g., a user's finger).

In some implementations, a touch controller 124 includes a management module 121-1, a host interface 129, a touch screen interface 128, and additional module(s) 125. The touch controller 124 may include various additional features that have not been illustrated for the sake of brevity and so as not to obscure pertinent features of the example implementations disclosed herein, and a different arrangement of features may be possible. The host interface 129 provides an interface to the computer system 110 through the data connections 101. Similarly, the touch screen interface 128 provides an interface to the touch screen 130 through the connections 103.

In some implementations, a management module 121-1 (also referred to as sensing module) includes one or more processing units 122-1 (sometimes herein called CPUs, processors, or hardware processors, and sometimes implemented using microprocessors, microcontrollers, or the like) configured to detect (or process), via the sensing array 132, a presence of one or more input objects 134 proximate or in contact with one or more sensor electrodes of the sensing array 132. In some implementations, the management module 121-1 performs operations (e.g., scan operations) to sense, via the sensing array 132, signals indicating the presence of the one or more input objects (e.g., input object 134). In some implementations, the management module 121-1 detects a pressure applied to the touch screen 130, light (e.g., infrared light) associated with an input object, an image associated with an input object, a capacitance of the sensors and/or a change in capacitance of one or more of the sensor electrodes of the sensing array 132 when an input object is proximate to or in contact with the touch screen 130. The sensing ability of the sensing module 121-1 depends on the type of sensors used in the touch screen 130 (e.g., capacitance sensors such as self-capacitance sensors and/or mutual-capacitance sensors).

In some implementations, the one or more CPUs 122-1 of the management module 121-1 are shared by one or more components within, and in some cases, beyond the function of touch controller 124. The management module 121-1 is coupled to the host interface 129, the additional module(s) 125, and the touch screen interface 128 in order to coordinate the operation of these components. In some implementations, one or more modules of management module 121-1 are implemented in the management module 121-2 of the computer system 110. In some implementations, one or more processors of computer system 110 (not shown) are configured to execute instructions in one or more programs (e.g., in the management module 121-2). The management module 121-2 is coupled to the processing device 120 in order to manage the operation of the processing device 120.

The additional module(s) 125 are coupled to the touch screen interface 128, the host interface 129, and the management module 121-1. As an example, the additional module(s) 125 may include a memory module (e.g., random access memory and/or flash memory). In some implementations, the memory module stores detected electrode responses, electrode response criteria, previously determined baselines, and the like. In some implementations, the additional module(s) 125 include analog and/or digital general purpose input/output ("GPIO") ports 107. In some implementations, the GPIO ports are coupled to a Programmable Interconnect and Logic ("PIL"), which acts as an interconnect between GPIO ports and a digital block array of the processing device 120. The digital block array may be configurable to implement a variety of digital logic circuits (e.g., DACs, digital filters, or digital control systems) using, in one implementation, configurable user modules ("Ums"). In some implementations, the additional module(s) 125 include an analog block array that is used to implement a variety of analog circuits. The analog block array may also be coupled to the GPIO ports.

Figure 2:
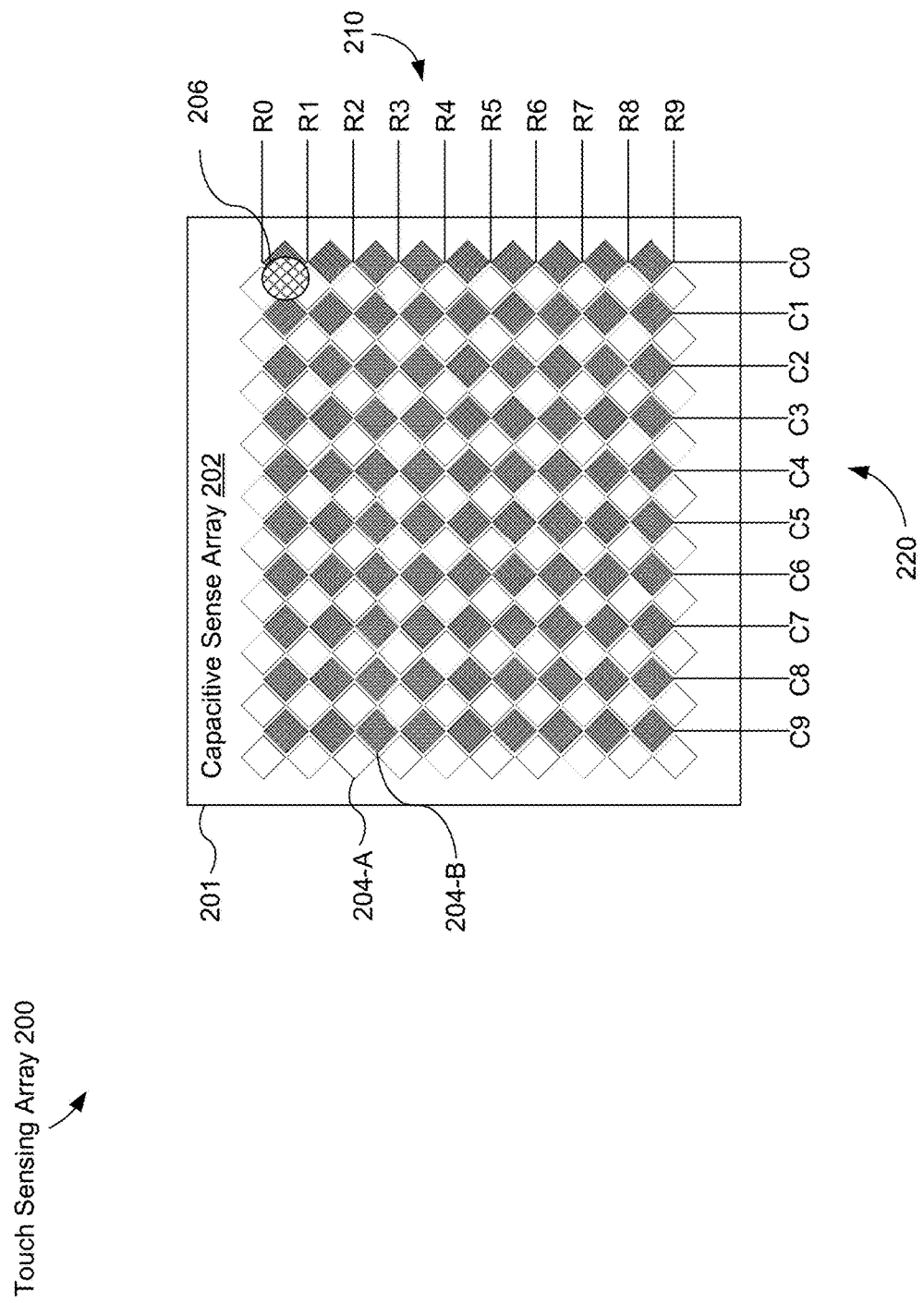
FIG. 2 is a diagram illustrating a touch sensing array including a substrate having a capacitive sense array (e.g., a touch screen), in accordance with various implementations.

FIG. 2 is a diagram illustrating a touch sensing array 200 (e.g., the touch screen 130 in FIG. 1) including a substrate 201 (e.g., a dielectric material) having a capacitive sense array 202 (e.g., the sensing array 132 in FIG. 1), in accordance with various implementations. As shown, FIG. 2 includes rows R0-R9 210 and columns C0-C9 220 of sensor elements (e.g., sensor elements 204-A, 204-B) arranged in an array. The rows R0-R9 210 and the columns C0-C9 220 of sensor elements are coupled with a sensing module (e.g., a management module 121-1). In the operations described in more detail below, each of the rows R0-R9 210 and columns C0-C9 220 of sensor elements may operate as both transmit and receive electrodes.

In some implementations, the plurality of sensor electrodes 204 includes both self-capacitance sensors and mutual-capacitance sensors. Within the capacitive sense array 202, each of the rows R0-R9 210 of the sensor elements 204 crosses with each of the columns C0-C9 220 of the sensor elements 204. In this way, galvanic isolation is maintained between the rows R0-R9 210 and the columns C0-C9 220. In some implementations, each of the columns C0-C9 220 are associated with an X-coordinate or range of X-coordinates of the X-Y plane and each of the rows R0-R9 210 are associated with a Y-coordinate or range of Y-coordinates of the X-Y plane. In this way, the sensing module can determine a location (e.g., the touch location 136 in FIG. 1) of a touch 206 on the capacitive sense array 202 using X and Y coordinates of the touch 206.

It should be understood that although the plurality of sensor electrodes 204 are shown to be diamond shaped, one or more of the sensor elements 204 may be formed of other shapes (e.g., lines, stripes, bars, triangles, snowflakes, and/or any other shape) and be organized in various other patterns (e.g., intersections, concentric circles, saw tooth pattern, Manhattan pattern, and/or other patterns) without departing from the claimed subject matter. In some implementations, the sensor elements 204 cover all or a portion of the surface area of the substrate 201. In some implementations, the sensor elements 204 and patterns of the sensor elements 204 are formed on or through one or more layers on the substrate 201.

In some implementations, a processing device (or one or more components of the processing device) measures capacitance of the plurality of sensor electrodes 204 using self-capacitance sensing. In some implementations, self-capacitance sensing measures added (or subtracted) capacitance at each of the plurality of sensor electrodes 204. For example, a user's touch (e.g., a finger) at a specific sensor electrode increases capacitance at the specific sensor electrode because the finger's capacitance is added to the capacitance of the specific sensor electrode. The processing device detects a "touch" when the added capacitance to the specific sensor electrode, relative to a baseline, exceeds a predefined threshold.

In some implementations, the processing device measures capacitance of the plurality of sensor electrodes 204 using mutual-capacitance sensing. In some implementations, mutual-capacitance sensing measures capacitance between a column electrode (e.g., a transmitter (TX) electrode), and a row electrode (e.g., a receiver (RX) electrode). For example, mutual-capacitance sensing measures a change (e.g., a decrease or increase) in capacitance between the column electrode and the row electrode resulting from a user's touch.

Figure 3:
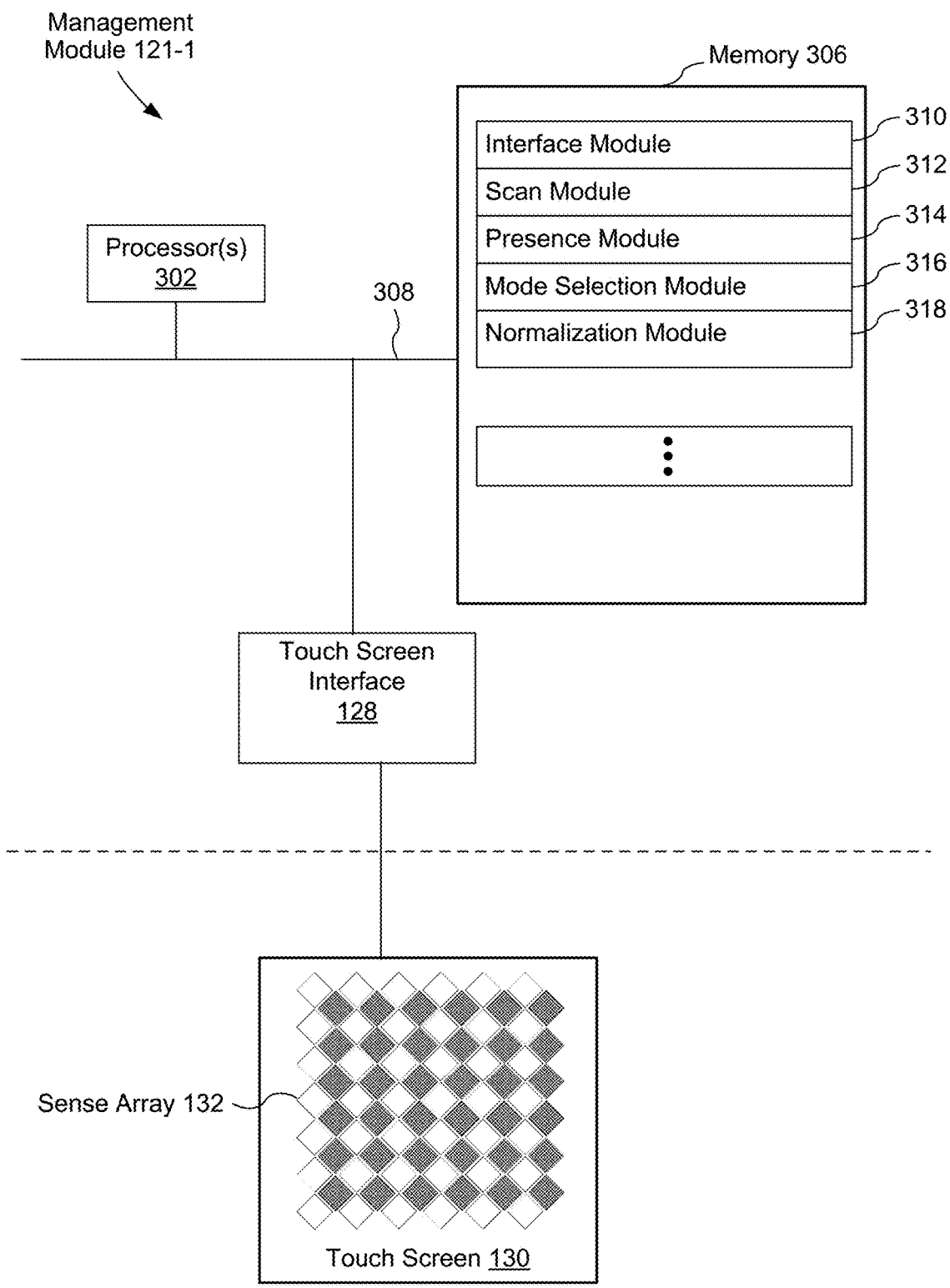
FIG. 3 is a block diagram illustrating an implementation of a management module.

FIG. 3 is a block diagram illustrating an implementation of a management module. The management module 121-1 typically includes one or more processing units 302 for executing modules, programs, and/or instructions stored in memory 306 and thereby performing processing operations, memory 306 and one or more communication buses 308 for interconnecting these components. The communication buses 308 optionally include circuitry (sometimes called a chipset) that interconnects and controls communications between system components. In some implementations, the management module 121-1 is coupled to a touch screen by the communication buses 308 and the touch screen interface 128. In some implementations, the memory 306, or the computer readable storage medium of the memory 306 stores the following modules and data used by the modules:

- an interface module 310 that is used for communicating with other components of the electronic device.
- a scan module 312 that is used to convert sensor signals (e.g., convert analog signals, such as voltage and/or change, into digital signals, or vice versa);
- a presence module 314 that is used to detect presence of a conductive object (e.g., a user's finger), or lack of a conductive object;
- a mode selection module 316 that is used to select a mode of operation of the electronic device based on electrode responses from the capacitive sense array; and
- a normalization module 318 that is used to normalize electrode responses from the capacitive sense array (i.e., establish a new baseline).

In some implementations, the scan module 312 uses a multiplexer or switch matrix (not shown) to distribute signals to one or more sensor electrodes. In some implementations, the scan module 312 uses the same or a different multiplexer (not shown) to receive current from the one or more sensor electrodes. This configuration allows the scan module 312 to scan all or specific portions of the capacitive sense array. In some implementations, scanning specific portions of the capacitive sense array (e.g., corner portions) consumes less energy compared to scanning the entire capacitive sensor array.

Each of the above identified elements may be stored in one or more of the previously mentioned memory devices that together form the memory 306, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 306 may store a subset of the modules and data structures identified above. Furthermore, the memory 306 may store additional modules and data structures not described above. For example, in some implementations, the memory 306 stores detected electrode responses, electrode response criterions, previously determined baselines, the water detection algorithm, the wipe detection algorithm, and other relevant information. In some implementations, the programs, modules, and data structures stored in memory 306, or the computer readable storage medium of the memory 306, provide instructions for implementing respective operations in the methods described herein.

FIG. 4 is a block diagram of a basic raw filtering module 400 in accordance with some implementations. Data processing for sense acquisition is associated with a relatively simple two stage process as illustrated in FIG. 4. Raw data flows through a common-mode filter 402 and then through an IIR (infinite impulse response) filter 404. FIG. 5 is a block diagram of a multi-stage signal processing module 500 that includes more than one feedback path (e.g., paths 502 and 504) in accordance with some implementations. The multi-stage signal processing module 500 includes a common mode filter 502, a IRR module 504, a derivative module 506, an integrator 508 and two feedback paths 510 and 512. The feedback makes the multi-stage signal processing module 500 more complex to analyze. Specifically, the two feedback paths 510 and 512 are near the bandwidth of the incoming signals. The feedback and the lack of significant bandwidth limitation on the signals could substantially affect the stability of the system, and make it more difficult to analyze performance and stability of the multi-stage signal processing module 500.

FIG. 6 is a block diagram of a common mode filtering (CMF) module 600 in accordance with some implementations. The CMF module 600 includes at least a CMF average module 602 and a CMF logic module 604. In some implementations, multiple channels are sampled at the same time, and certain sampled information is common to the simultaneously sampled channels. Such common information is not desirable and is preferably removed, because it is not correlated to a detected signal associated with a touch by an object on a surface of the capacitive sense array. The CMF module 600 calculates the average of samples that do not correlate to a detected signal (an object on the screen), and uses this average information to tweak all signals to remove the undesirable common information. In an example, the CAF average is derived from the raw data signals that are gathered simultaneously within a slot.

It is noted that the CMF Average block 602 and the CMF Logic block 604 in FIG. 6 are simplified functional blocks. In some implementations, these blocks contain logic empirically derived to make specific computations or decisions. For example, in some implementations the CMF Average module 602 performs the total average as well as the average of sampled data below a predefined baseline. In some implementations, the CMF Logic block 604 optionally outputs data that is one of a CMF average of all raw data, an average of negative raw data values, and a saturated value at a baseline.

Figure 7:
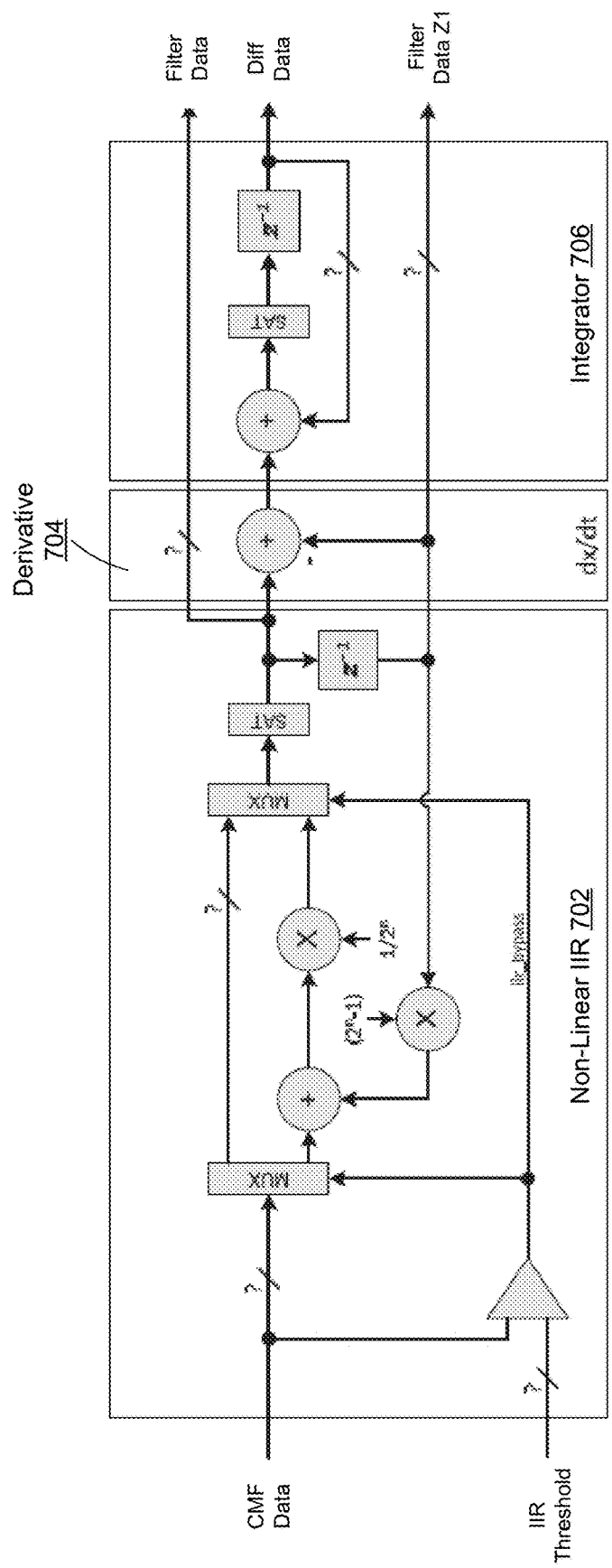
FIG. 7 is a block diagram of IIR (infinite impulse response) filtering in accordance with some implementations.

FIG. 7 is a block diagram of an IIR (infinite impulse response) filtering module 700 in accordance with some implementations. In some implementations, the IIR module 700 includes three separate stages 702, 704 and 706. The first stage 702 is a non-linear IIR module. The IIR is processed only if the information coming into the IIR is relatively small; otherwise, the IIR is bypassed. The signal slowdown (due to the IIR) is eliminated if the incoming signal has significant magnitude. Note that the signal coming into this stage is typically centered around zero.

The next stage 704 is a derivative module that reuses the delay within the IIR filter. This gives a sense of change within the incoming signal (e.g., was there a large signal difference on one given sensor from one sample to the next).

In some implementations, the last stage 706 is an integrator. In theory, the derivative module 704 combined with the integrator 706 will cancel each other (i.e., a zero and a pole at 0 Hz). However, a pure integrator has no known DC bias point without it previously being defined. In addition, any slight input bias (e.g., from the input signal or round off errors in the processing) can cause the integrator to walk up or down depending on the nature of these errors.

Because of this, the integrator 706 in some implementations has a reset somewhere downstream in the signal chain to prevent signal runaway and saturation. In some implementations, the baselining operations further downstream perform an integrator reset.

Some implementations use an integrator followed by a differentiator. Because of the integration, there is no DC stable point, so there is generally code elsewhere to force the baselines to reset to a known position. In some instances, any imbalance or signal error could integrate causing the baselines to "walk."

FIG. 8.1 is a block diagram of a raw data filtering/processing module 800 according to some implementations. The basic idea is to perform a comparison between two signals derived from the same signal source, but with very different bandwidths. One path is the pseudo equivalent of a continuous average of the incoming signal (this is the offset or baseline) while the other filters the incoming signal to produce just slightly bandwidth limited data (the filtered data). Thus the difference of these two creates a band limited representation of the signal, and includes just AC information (see FIG. 8.4).

Both of the IIRs 802 and 804 in FIG. 8.1 are set up to allow their responses to move based on the signal. In this way, if there is a reasonable chance that a touch has happened, the data is allowed to pass while keeping a firm hold on the offset.

The Common Noise Detection (CND) 806 illustrated in FIG. 8.1 is processed on the output of the band limited filtering, so it detects only band limited noise common to parallel sampled channels. In some instances, limiting the response range to the CND enhances the accuracy of averaging noise that is common to all parallel sampled channels.

In a parallel IIR design, there are two filters whose poles can be moved based on some conditions. In some implementations, the variation in response has two states, where filtering is either regarded as "fast" or "slow" based on some signal crossing some threshold.

FIG. 8.2 is a block diagram of IIR filter stages 820 according to some implementations. Although not explicitly shown, the IIR filters of the IIR filter stages 810 are typically designed so that they perform "opposite" to each other. For example, when the Filter Data is "fast," passing more information than it would otherwise, its counterpart, the Offset Filter, is operating "slow" to insure that the averaging is representative of a much longer history.

FIG. 8.3 provides an example filter response 830 when there is a small signal change in accordance with some implementations. FIG. 8.3 shows what a typical IIR response looks like according to some implementations. In this example, the Filter Data 802 is set to 50% past and 50% present information assuming a sampling rate of 120 Hz. This is a pole at approximately 10 Hz. The Offset Data filter is set to 1/256 present and 255/256 past, creating a pole that is less than 0.1 Hz at a 120 Hz sampling rate. Given the difference between two filters on a common signal, the natural result is a signal that is band limited and has no DC content. In this figure, the upper curve shows the filter data 802, and the lower curve shows the offset data 804.

FIG. 8.4 shows the frequency response 840 of the differential IIR stage. In order to improve response when an active signal is predicted, the Filter Data IIR filter is pushed to become a wide open pipe as shown in FIG. 8.5. However, the Offset Data filter is pushed in the opposing direction to insure the signal represents a much longer history (i.e. we do not want the offset to move aggressively). In the example shown in FIGS. 8.4 and 8.5, the Offset Data filter is set to $\frac{1}{2}^{12}$ present and consequently $(2^{12}-1)/(2^{12})$ of the past sample. Note that the Offset Data filter is maintained as a filter to insure that it still moves and never enters a latching condition. In FIG. 8.5, the upper curve illustrates the filter data 812 and the lower curve illustrates the offset data 814.

FIG. 8.6 is an input to output response 860 in accordance with some implementations. The input to output response 860 includes a much wider band of information, but still eliminates DC.

FIGS. 8.7 and 8.8 provide block diagrams of a common noise detection module 870 and a common noise filtering module 880 according to some implementations, respectively. The AC data stream from the differential IIR is accumulated for parallel sampled data. The assumption is that noise common to all of the ADCs that are simultaneously sampled may be approximately determined and, therefore removable. Note that only the data below a programmable noise threshold is taken as a signal that may have noise. Otherwise, the signal is assumed to be data that cannot contribute as common noise because it has other information that is sufficiently greater than the noise signal. Note that the determined Noise Data is stored in memory for future processing, creating the additional $z^{-1}$ output. The noise history is useful for computing the Signal Data (e.g., a previous sample of it) for any given sensor.

An interesting thing to note is that the noise information can be used for other purposes such as qualifying an LCD and sensor array combination.

Note that the actual removal of common noise occurs downstream as depicted in FIG. 8.8. It is determined by taking the Noise Data away from the Difference Data. Note that the Signal Data can be generated at any time with noise data being maintained in memory.

FIG. 8.9 illustrates memory usage 890 by some implementations. Memory usage in this model includes two full maps 892 and 894 for the filters. In addition, an array of noise information 896 is maintained. The noise information 896 is only as large as the number of rows simultaneously scanned. Some implementations visualize only mutual capacitance related information in memory.

FIG. 8.10 provides pseudo code 810 to implement a differential IIR baseline algorithm according to some implementations. As illustrated, the code implementation is simple and efficient.

As illustrated in FIGS. 8.1-8.10, the basic idea is to perform a comparison between two signals derived from the same signal source, but with very different bandwidths. One path is the pseudo equivalent of a continuous average of the incoming signal (the offset), whereas the other outputs data that has slightly limited bandwidth (the filtered data). Thus the difference of these two is a band limited representation of the signal, including just AC information. FIG. 8.1 provides a basic representation of the design. In some implementations, the Offset IIR pole is pushed to zero in the event of a detected signal. This simplifies to a design that freezes the Offset IIR when it is in its slow mode of operation. FIG. 8.2 provides a basic flowchart of one algorithm.

Figure 9:
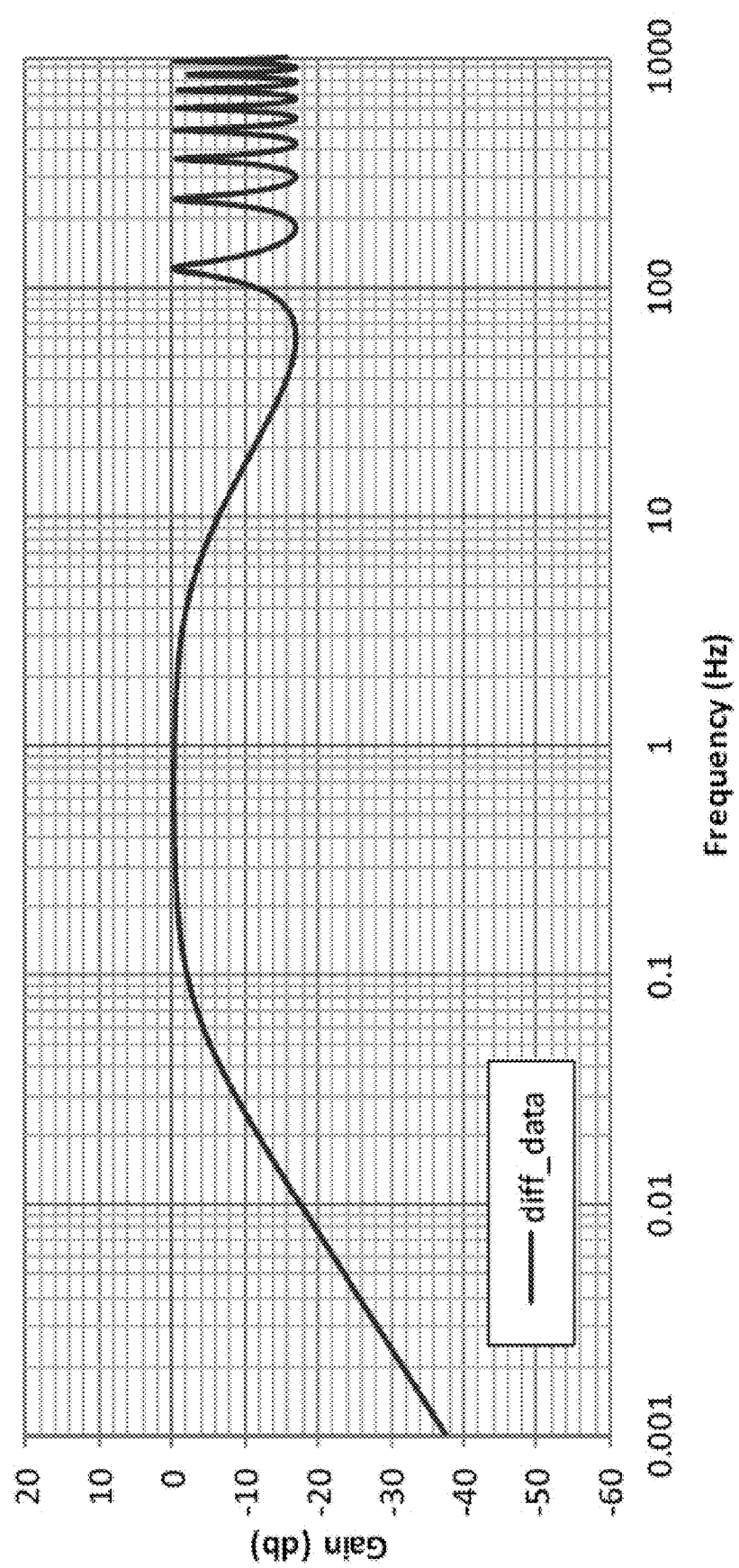
FIG. 9 illustrates differential IIR filter setup in accordance with some implementations.

FIG. 9 illustrates differential IIR filter setup in accordance with some implementations. The filtering algorithm is set up for a band pass response 900 as shown in FIG. 9. This equates to a pair of IIR filters, one with data processing $1/4^{th}$ new and $3/4^{th}$ old, and the other processing $1/256^{th}$ new (a pole at ~0.1 Hz) and $255/256^{th}$ old (a pole at ~3 Hz). The Common Noise Detector is setup to interpret >±250 difference counts as a likely signal rather than noise (i.e., the signal versus noise threshold).

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, as long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of processing raw response signals for capacitive sense arrays, comprising:
at an electronic device having one or more processors and a capacitive sense array:
receiving a raw response signal from the capacitive sense array;
computing, from the raw response signal, an offset signal that represents a continuous average baseline value of the raw response signal over a period of time;
while computing the offset signal from the raw response signal, concurrently filtering the raw response signal to a limited frequency band, thereby forming a bandwidth limited signal;
computing a differential signal as a difference between the offset signal and the bandwidth limited signal that are concurrently generated from the raw response signal; and
using the differential signal to detect an object proximate to the capacitive sense array.

2. The method of claim 1, further comprising applying a common noise detector to the differential signal to identify a noise signal.

3. The method of claim 2, further comprising subtracting the noise signal from the differential signal to form an output signal.

4. The method of claim 1, further comprising adjusting a speed of the offset signal computation and a speed of the response signal filtering in accordance with a determination that the raw response signal crosses a threshold value at a first time.

5. The method of claim 4, wherein adjusting a speed of the offset signal computation and a speed of the response signal filtering comprises increasing the speed of the offset signal computation and decreasing the speed of the response signal filtering.

6. The method of claim 5, further comprising decreasing the speed of the offset signal computation and increasing the speed of the response signal filtering at a second time subsequent to the first time.

7. A system comprising:
a capacitive sense array configured to generate a raw response signal;
an offset signal computing circuit configured to compute, from the raw response signal, an offset signal representing an average baseline value of the raw response signal over a period of time;
a filtering circuit configured to, while computing the offset signal from the raw response signal, concurrently filter the raw response signal to a limited frequency band, thereby forming a bandwidth limited signal;
a differential circuit for computing a differential signal as the difference between the offset signal and the bandwidth limited signal that are concurrently generated from the raw response signal; and
a processing device that uses the differential signal to detect an object proximate to the capacitive sense array.

8. The system of claim 7, further comprising a common noise detector that uses the differential signal to identify a noise signal.

9. The system of claim 8, wherein the processing device is configured to subtract the noise signal from the differential signal to form an output signal.

10. The system of claim 7, further comprising control circuitry to adjust a speed of the offset signal computation and a speed of the response signal filtering in accordance with a determination that the raw response signal crosses a threshold value at a first time.

11. The system of claim 10, wherein the control circuitry is configured to generate control signals for the offset signal computing circuit and the filtering circuit to increase the speed of the offset signal computation and decrease the speed of the response signal filtering when the raw response signal crosses the threshold value at the first time.

12. The system of claim 11, wherein the control circuitry is configured to generate control signals for the offset signal computing circuit and the filtering circuit to decrease the speed of the offset signal computation and increase the speed of the response signal filtering at a second time subsequent to the first time.

13. A non-transitory computer readable storage medium, storing one or more programs configured for execution by one or more processors of a sensing system having a capacitive sense array, the one or more programs including instructions for:
receiving a raw response signal from the capacitive sense array;
computing, from the raw response signal, an offset signal that represents a continuous average baseline value of the raw response signal over a period of time;
while computing the offset signal from the raw response signal, concurrently filtering the raw response signal to a limited frequency band, thereby forming a bandwidth limited signal;
computing a differential signal as a difference between the offset signal and the bandwidth limited signal that are concurrently generated from the raw response signal; and
using the differential signal to detect an object proximate to the capacitive sense array.

14. The computer readable storage medium of claim 13, wherein the one or more programs further comprise instructions for applying a common noise detector to the differential signal to identify a noise signal.

15. The computer readable storage medium of claim 14, wherein the one or more programs further comprise instructions for subtracting the noise signal from the differential signal to form an output signal.

16. The computer readable storage medium of claim 13, wherein the one or more programs further comprise instructions for adjusting a speed of the offset signal computation and a speed of the response signal filtering in accordance with a determination that the raw response signal crosses a threshold value at a first time.

17. The computer readable storage medium of claim 16, wherein adjusting a speed of the offset signal computation and a speed of the response signal filtering comprises increasing the speed of the offset signal computation and decreasing the speed of the response signal filtering.

18. The computer readable storage medium of claim 17, wherein the one or more programs further comprise instructions for decreasing the speed of the offset signal computation and increasing the speed of the response signal filtering at a second time subsequent to the first time.

19. The method of claim 1, wherein at each instant of time, the offset signal is a weighted combination of past sampled information of the raw response signal and present sampled information of the raw response signal.

20. The method of claim 19, wherein the offset signal is a combination of 50% of the past sampled information of the raw response signal and 50% of the present sampled information of the raw response signal.

\* \* \* \* \*